United States Patent [19]

Sando et al.

[11] Patent Number: 4,479,369

[45] Date of Patent: Oct. 30, 1984

[54] APPARATUS FOR TREATING A TEXTILE PRODUCT WITH THE USE OF LOW-TEMPERATURE PLASMA

[75] Inventors: Yoshikazu Sando; Hiroshi Ishidoshiro; Matsuo Minakata, all of Wakayama; Tokuju Goto, Nara, all of Japan

[73] Assignee: Sando Iron Works Co., Ltd., Wakayama, Japan

[21] Appl. No.: 481,851

[22] Filed: Apr. 4, 1983

[51] Int. Cl.³ .............................................. D06B 3/10
[52] U.S. Cl. ......................................... 68/5 C; 8/444;
118/50.1; 118/718; 118/723; 219/121 P;
219/121 PY; 427/38
[58] Field of Search ................. 8/149.2, 444; 204/298;
34/36, 92; 68/5 C, 5 D, 5 E; 427/38, 39;
118/50.1, 718, 723; 219/121 P, 121 PY, 121
PD, 121 PE, 121 PF, 121 PG

[56] References Cited

U.S. PATENT DOCUMENTS

| | | | |
|---|---|---|---|
| 1,917,168 | 7/1933 | Uhlmann | 8/444 |
| 2,402,269 | 6/1946 | Alexander et al. | 118/718 X |
| 2,879,739 | 3/1959 | Bugbee et al. | 118/718 |
| 3,292,242 | 12/1966 | Giger | 427/39 X |
| 3,632,299 | 1/1972 | Thorsen | 8/444 |
| 4,013,415 | 3/1977 | Burov et al. | 219/121 P X |
| 4,057,907 | 11/1977 | Rapino et al. | 34/92 X |
| 4,065,137 | 12/1977 | Rueggeberg et al. | 65/5 E X |
| 4,083,205 | 4/1978 | Clarke et al. | 118/50.1 X |
| 4,274,209 | 6/1981 | Kawaguchi | 68/5 E X |
| 4,292,384 | 9/1981 | Straughan et al. | 219/121 PD |

FOREIGN PATENT DOCUMENTS

| | | | |
|---|---|---|---|
| 5682 | 1/1977 | Japan | 204/298 |
| 54314 | 3/1982 | Japan | 427/39 |

*Primary Examiner*—Philip R. Coe
*Assistant Examiner*—Frankie L. Stinson
*Attorney, Agent, or Firm*—Toren, McGeady and Stanger

[57] ABSTRACT

An apparatus for treating a textile product with the use of low-temperature plasma includes a reactor, and an arrangement for transporting a textile product to be treated, located within the reactor and arranged to move the textile product between taking-up shafts. The textile product is passed through a passage in the reactor formed between a pair of electrode plates. A mechanism maintains a vacuum in the interior of the reactor, and gas is supplied into the reactor between the electrode plates. The electrode plates are connected to produce a low-temperature plasma therebetween. The textile product such as a cloth, string or yarn can be treated effectively using only small amounts of heat energy and water resource.

7 Claims, 2 Drawing Figures

APPARATUS FOR TREATING A TEXTILE PRODUCT WITH THE USE OF LOW-TEMPERATURE PLASMA

BACKGROUND OF THE INVENTION

1. Field of the Invention

The present invention relates to an apparatus for treating a textile product such as a cloth, string and yarn with the use of low-temperature plasma.

2. Description of the Prior Art

For subjecting a textile product such as a cloth produced industrially to such treatment as desizing and scouring, the textile product has usually been wet-heat treated by using large quantities of a specified agent, heat and water resources under high or normal pressure. To describe an example of well-known pretreatment of a cloth practically, a cloth to be treated is soaked with a treating solution containing caustic alkali and a penetrating agent, steamed in a reactor under high or normal pressure for a certain period to complete the pretreatment, washed with water repeatedly to remove the agent used and foreign matters adhering to the cloth, and dried by passing the cloth through a dryer to complete the pretreatment.

However, it is the present status in such a treating process that a costly treating agent is necessitated, a large amount of heat is necessary for the reaction between the agent and the textile product, and a large size washing machine and a large amount of water are needed for removing the treating agent and foreign matters from the textile product, thus consuming large quantities of water resource and heat energy uneconomically. Moreover, since waste water from the washing machine contains unavoidably the treating agent, causing the problem of public pollution, its treatment needs large installation cost and personnel expenses.

SUMMARY OF THE INVENTION

Under such circumstances, the object of the present invention is to offer an apparatus for the treatment, such as pretreatment, of a textile product, for instance a cloth, string and yarn, with the use of possibly small amounts of heat energy and water resource by utilizing the effect of low-temperature plasma applied to the textile product.

The principle of the invention is to apply low-temperature plasma to a textile product to be treated while the textile product taken up on a textile product taking-up shaft is transported to another textile product taking-up shaft reciprocatedly by taking up the textile product through a textile product passage in a reactor under vacuum.

BRIEF DESCRIPTION OF THE DRAWINGS

The drawings are to show the examples of the apparatus for treating a textile product with the use of low-temperature plasma.

DETAILED DESCRIPTION OF THE PREFERRED EMBODIMENTS

Preferred embodiments of the invention will be described in detail in the following with reference to the attached drawings.

Figure 1:
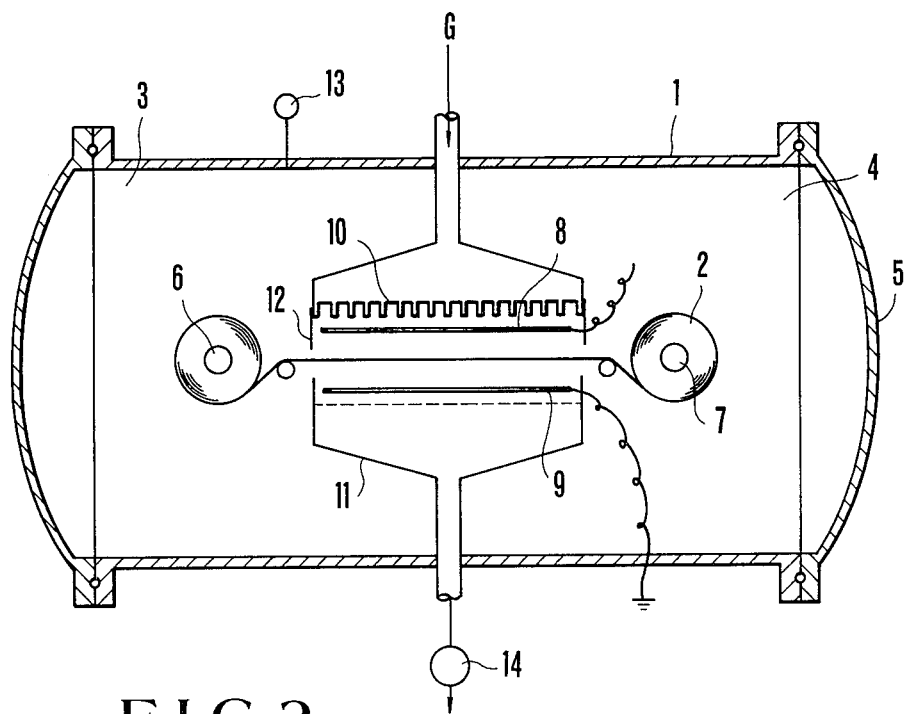
FIG. 1 is an explanatory drawing of the apparatus for treating a cloth.

In FIG. 1, 1 is a reactor, and the reactor 1 is provided with openings 3 and 4 for taking in and out a cloth to be treated, respectively having a cover 5 for sealing them. 6 and 7 are a pair of cloth taking-up shafts provided adjacently to the openings 3 and 4, and the two cloth taking-up shafts are designed so that they can move in the positive and negative directions intermittently by means of a driving mechanism such as a motor (not shown in the drawing) for transporting a cloth to be treated 2 in both directions alternately. 8 and 9 are a pair of electrode plates provided in the reactor 1 by putting a cloth passage formed between the two cloth taking-up shafts 6 and 7 therebetween. One of the electrode plates, for instance 8, is connected to an oscillator (not shown in the drawing) provided outside the reactor 1 for supplying high frequency electric wave to the electrodes, and another electrode plate (in this instance, 9) is earthed. The electrode plates 8 and 9 are made of such materials as a metal gauze or a porous metal plate for distributing a gas for producing low-temperature plasma uniformly all over the electrode plates. 10 is a comblike gas nozzle for jetting a gas such as air, oxygen and argon for producing low-temperature plasma to the electrode plate 8. 11 is a gas exhaust duct provided at the position opposite to the gas nozzle 10 by putting the electrodes and the cloth passage therebetween. 12 is an enclosure provided at the circumference of the electrode plates 8 and 9 for preventing the scattering of the low-temperature plasma and the gas activated by the plasma formed by the electrode plates 8 and 9 in order to apply the plasma and the activated gas efficiently to the cloth. 13 is a vacuum meter, and 14 is a vacuum pump.

The construction of the apparatus in this example is as described above. Now, its functions will be described in the following.

At first, one of the cloth taking-up shaft, for instance the shaft 6, on which a long cloth to be treated 2 is taken up, is set in the reactor 1, the front end of the cloth is attached to another cloth taking-up shaft, in this instance the shaft 7, and the covers 5 are closed. Then, the vacuum pump 14 is operated for controlling the vacuum degree of the interior of the reactor to 0.6 to 0.7 Torr, a gas such as air and oxygen is supplied from the gas nozzle 10 into the interior of the reactor 1 so as to control the vacuum degree to about 1 Torr, and high frequency electric wave, for instance with 13.56 MHz, is supplied from the oscillator to the electrode plates 8 and 9. By driving the cloth taking-up shaft the cloth 2 is transported through the cloth passage between the electrode plates 8 and 9, i.e., through a gas atmosphere excited with the low-temperature plasma. Sizing agent (such as polyvinyl alcohol) adhering to the cloth 2 is oxidized due to the radiation of low-temperature plasma, and the desizing of the cloth as the pretreatment thereof is done effectively. The quality of the gas for producing low-temperature plasma and the time of radiating the plasma may be selected suitably according to the kind of cloth and the object of treatment.

Figure 2:
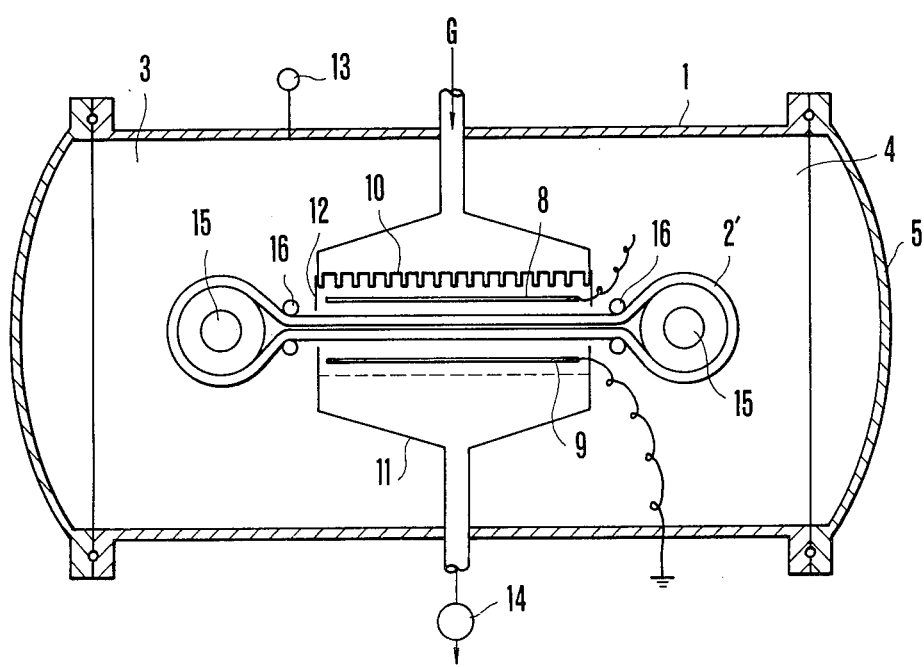
FIG. 2 is an explanatory drawing of the apparatus for treating hank yarns.

Another example of the present inventive apparatus shown in FIG. 2 is for the treatment of hank yarns 2'. The apparatus does not differ substantially from the previous example constructionally except that the cloth taking-up shafts 6 and 7 are substituted with rotation shafts of hank yarns 15 and guide rolls 16 are attached.

As described in detail in the above, the present invention is to apply low-temperature plasma to a textile product to be treated while the textile product taken up on a textile product taking-up shaft is transported to the other textile product taking-up shaft reciprocatedly by taking up the textile product through a textile product passage in a reactor under vacuum. Due to the effect of low-temperature plasma, treatment of a textile product such as pretreatment including desizing and scouring can be done with the use of limited amounts of treating agent, heat energy and water resource economically and without causing the problem of public pollution. Particularly, the present inventive apparatus is to carry out the radiation of low-temperature plasma to the textile product continuously, so that the apparatus is very suitable for the treatment of a textile product such as a long cloth produced commercially.

In the above-mentioned examples, low-temperature plasma is produced in the reactor adjacent to the textile product passing through the textile product passage, but low-temperature plasma produced outside the reactor by suitable means can be applied for the treatment of a textile product in the present invention, and such a procedure is particularly suitable for such purposes as to improve the fixability of a dye to a textile product, to subject a textile product to shrink resistant finish, and further as the treatment of yarns.

We claim:

1. An apparatus for treating a textile product with a low temperature plasma comprising a reactor, a first electrode plate and a second electrode plate arranged within the reactor opposite one another in facing relation and forming therebetween a passage, each of said first electrode plate and second electrode plate having a first surface and an oppositely facing second surface with said first surfaces facing one another and defining the opposite sides of the passage, each of said first electrode plates and second electrode plate having a first side along one edge of said first and second surfaces and an opposite second side along an opposite edge of said first and second surfaces with said first sides and second sides disposed opposite one another and defining the opposite ends of said passage, means for transporting a textile product through said passage in the direction extending between the first and second sides, said transporting means including a first take-up shaft located adjacent to and spaced outwardly from said first sides and a second take-up shaft located adjacent to and spaced outwardly from said second sides so that a textile product wound on one of said first or second take-up shafts can be unwound from the one of said first and second take-up shafts and wound on the other of said first or second take-up shafts with the textile product passing through said passage, a mechanism connected to said reactor for maintaining a vacuum within said reactor, said first and second electrode plates being formed of a gas porous material, means for supplying gas to said second surface of said first electrode plate so that the gas flows through said first electrode plate across said passage and through said second electrode plate, means for collecting the gas flowing through said second electrode plate for conveying the gas out of said reactor, and means connected to said first electrode plate and said second electrode plate for producing a low-temperature plasma in the space between the first surfaces of said first and second electrode plates.

2. An apparatus, as set forth in claim 1, wherein said means for supplying gas comprises a gas inlet duct, a comb-like gas nozzle located in the outlet from said gas inlet duct and directed toward the second surface of said first electrode plate for jetting a gas toward the second surface of said first electrode plate.

3. An apparatus, as set forth in claim 2, wherein said means for collecting gas comprises a gas exhaust duct laterally enclosing said second electrode plate and arranged to conduct the gas passing through said second electrode plate out of said reactor.

4. An apparatus, as set forth in claim 3, wherein said means for producing a low-temperature plasma comprises means for connecting said first electrode plate to a source of high frequency electric waves, and means for grounding said second electrode plate.

5. An apparatus, as set forth in claim 4, wherein said first and second electrode plates are formed of a metal gauze.

6. An apparatus, as set forth in claim 4, wherein said first and second electrode plates are formed of a porous metal plate.

7. An apparatus, as set forth in claim 4, wherein an enclosure member laterally encloses said first electrode plate and extends into said passage formed between said first and second electrode plates for preventing the scattering of the low-temperature plasma and the gas activated by the plasma.

* * * * *